(12) United States Patent
Alexander

(10) Patent No.: US 10,779,384 B2
(45) Date of Patent: *Sep. 15, 2020

(54) LIGHTING SYSTEM

(71) Applicant: LIFI Labs, Inc., San Francisco, CA (US)

(72) Inventor: Marc Alexander, San Francisco, CA (US)

(73) Assignee: LIFI Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,384

(22) Filed: Nov. 12, 2019

(65) Prior Publication Data

US 2020/0084865 A1     Mar. 12, 2020

Related U.S. Application Data

(63) Continuation of application No. 15/905,637, filed on Feb. 26, 2018, now Pat. No. 10,512,140.

(60) Provisional application No. 62/475,516, filed on Mar. 23, 2017, provisional application No. 62/463,665, filed on Feb. 26, 2017.

(51) Int. Cl.
| | | |
|---|---|---|
| *F21L 4/00* | (2006.01) | |
| *H05B 47/19* | (2020.01) | |
| *G05B 15/02* | (2006.01) | |
| *F21V 29/83* | (2015.01) | |
| *F21V 21/14* | (2006.01) | |
| *F21V 14/02* | (2006.01) | |
| *F21S 9/02* | (2006.01) | |
| *F21S 8/02* | (2006.01) | |
| *F21V 7/06* | (2006.01) | |
| *F21V 23/04* | (2006.01) | |
| *F21Y 115/10* | (2016.01) | |
| *F21V 3/02* | (2006.01) | |

(52) U.S. Cl.
CPC ............ *H05B 47/19* (2020.01); *F21S 8/026* (2013.01); *F21S 9/02* (2013.01); *F21V 7/06* (2013.01); *F21V 14/02* (2013.01); *F21V 21/14* (2013.01); *F21V 23/045* (2013.01); *F21V 29/83* (2015.01); *G05B 15/02* (2013.01); *F21V 3/02* (2013.01); *F21Y 2115/10* (2016.08)

(58) Field of Classification Search
CPC ........ H05B 37/0272; F21S 8/026; F21S 8/02; F21S 8/022; F21S 8/024; F21S 8/028; F21S 8/081; F21S 8/083
See application file for complete search history.

(56) References Cited

U.S. PATENT DOCUMENTS

| | | |
|---|---|---|
| 9,125,331 B2 | 9/2015 | Yeates et al. |
| 9,206,964 B2 | 12/2015 | Marsh et al. |
| 9,222,532 B2 | 12/2015 | Thomas et al. |
| 9,534,775 B2 | 1/2017 | Wilcox et al. |

(Continued)

OTHER PUBLICATIONS

International Search Report and Written Opinion for International Application No. PCT/US18/19771.

*Primary Examiner* — Matthew J. Peerce
(74) *Attorney, Agent, or Firm* — Jeffrey Schox; Diana Lin

(57) ABSTRACT

A connected downlight including: a housing module including a first housing end and a second housing end; a lighting module mounted to the first housing end; and a wireless communication module including an antenna and arranged within the housing interior proximal the second housing end.

18 Claims, 9 Drawing Sheets

(56) References Cited

U.S. PATENT DOCUMENTS

| | | |
|---|---|---|
| 2009/0284155 A1 | 11/2009 | Reed et al. |
| 2014/0199168 A1* | 7/2014 | Spiro ................... F04D 29/582 |
| | | 416/5 |
| 2014/0375204 A1 | 12/2014 | Dai et al. |
| 2015/0198324 A1 | 7/2015 | OBrien et al. |
| 2015/0216016 A1 | 7/2015 | Reed |
| 2015/0338077 A1* | 11/2015 | Johnson ................ F21V 23/005 |
| | | 362/234 |
| 2018/0245780 A1* | 8/2018 | Okada ................ H05B 37/0272 |

* cited by examiner

LIGHTING SYSTEM

CROSS-REFERENCE TO RELATED APPLICATIONS

This application is a continuation of U.S. patent application Ser. No. 15/905,637 filed 26 Feb. 2018, which claims the benefit of U.S. Provisional Application No. 62/463,665 filed 26 Feb. 2017 and 62/475,516 filed 23 Mar. 2017, all of which are incorporated in their entireties by this reference.

TECHNICAL FIELD

This invention relates generally to the connected lighting field, and more specifically to a new and useful lighting system and housing in the connected lighting field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
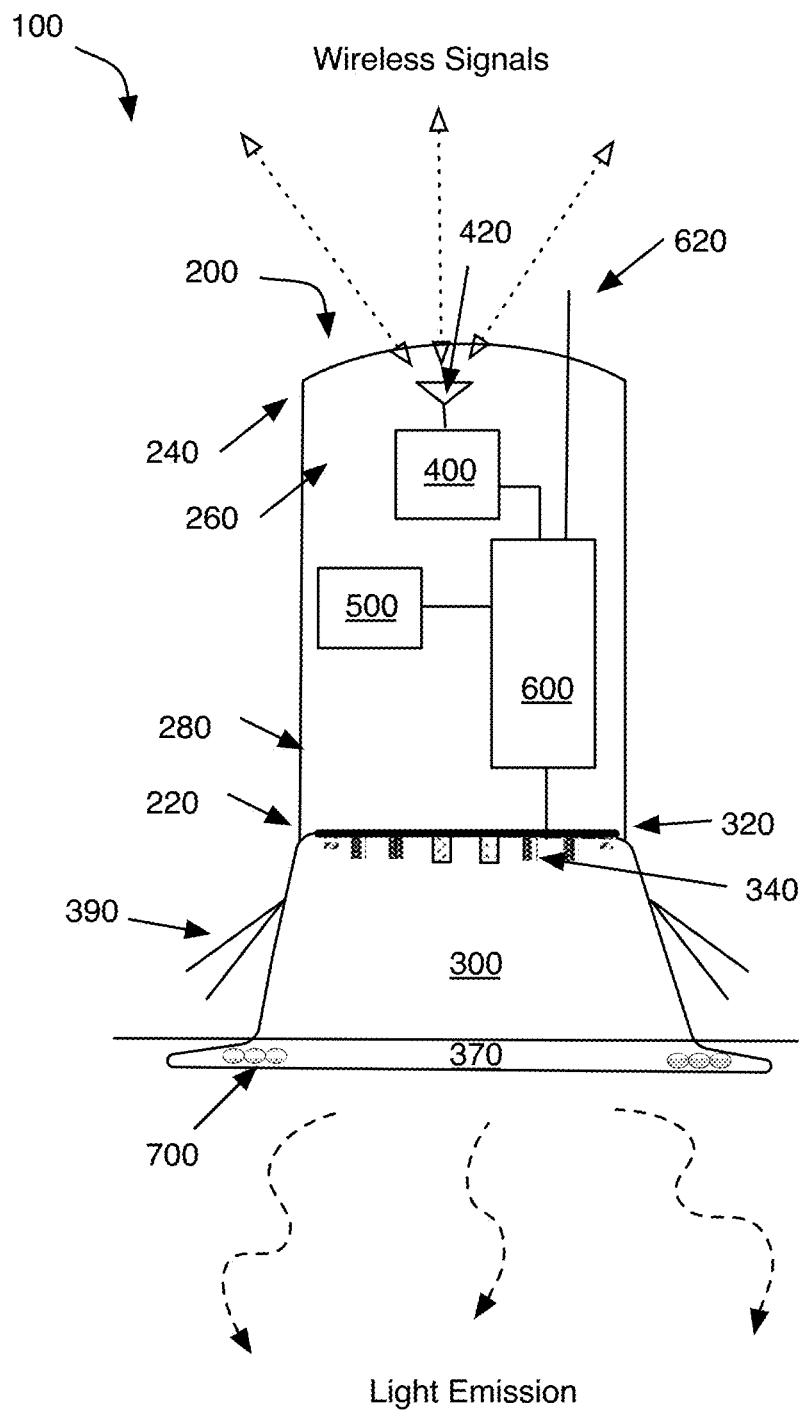
FIG. 1 is a schematic representation of an embodiment of the lighting system.

As shown in FIG. 1, the lighting system 100 includes a housing module 200 (e.g., housing) including a first housing end 220 and a second housing end 240 defining a housing interior 260 and a housing exterior 280; a lighting module 300 including a substrate 320 mounted to a plurality of light emitting elements 340, a facing 370, and a mounting mechanism 390 arranged on the housing exterior 280 proximal the first housing end 220; a wireless communication module 400 including an antenna 420 and arranged within the housing interior 260 proximal the second housing end 240; a computing system 500, and a power supply unit 600. The lighting system 100 can additionally include a plurality of sensors 700.

The lighting system 100 functions as a wirelessly-connected lighting fixture (e.g., bulb). The lighting system 100 further functions to cool components that generate heat (e.g., by conduction, convection, radiation, etc.), such as the lighting module 300 and/or the power supply unit 600.

The lighting system 100 preferably removably mounts to a lighting fixture or socket, preferably mounted within a ceiling (e.g., as a downlight), but can alternatively permanently or transiently mount to any other mounting point, such as a track lighting fixture or any suitable light fixture. The fixture or socket is preferably electrically connectable to a primary power source xx (e.g., power grid, wall power, etc.), by which the lighting system 100 preferably receives and powers the lighting system components through the power supply unit 600. However, the lighting system 100 can directly connect to the primary power source xx (e.g., via power terminals), be wirelessly connected to the primary power source (e.g., receive wireless power), or be otherwise electrically connected to the primary power source xx. The lighting system 100 can additionally or alternatively function to provide backup power (e.g., emergency power) in the event of power cessation (e.g., during an emergency, a blackout, etc.).

In operation, the lighting system 100 operates based on control instructions received from a device 800. The device 800 preferably communicates with the lighting system 100 to control lighting system operation, receive information, data, or instructions from the lighting system 100, or otherwise interact with the lighting system 100. The lighting system 100 can additionally or alternatively function to provide a wireless network extension for the local area network or for secondary lighting systems 100 within a common venue (e.g., as a mesh node, a gateway, a repeater, a failover connection, etc.), and/or to add connected functionality (e.g., remote controllability) to a non-connected lighting module (e.g., a lightbulb). However, the lighting system 100 can operate automatically, or operate in any suitable manner.

2. Example

Figure 2:
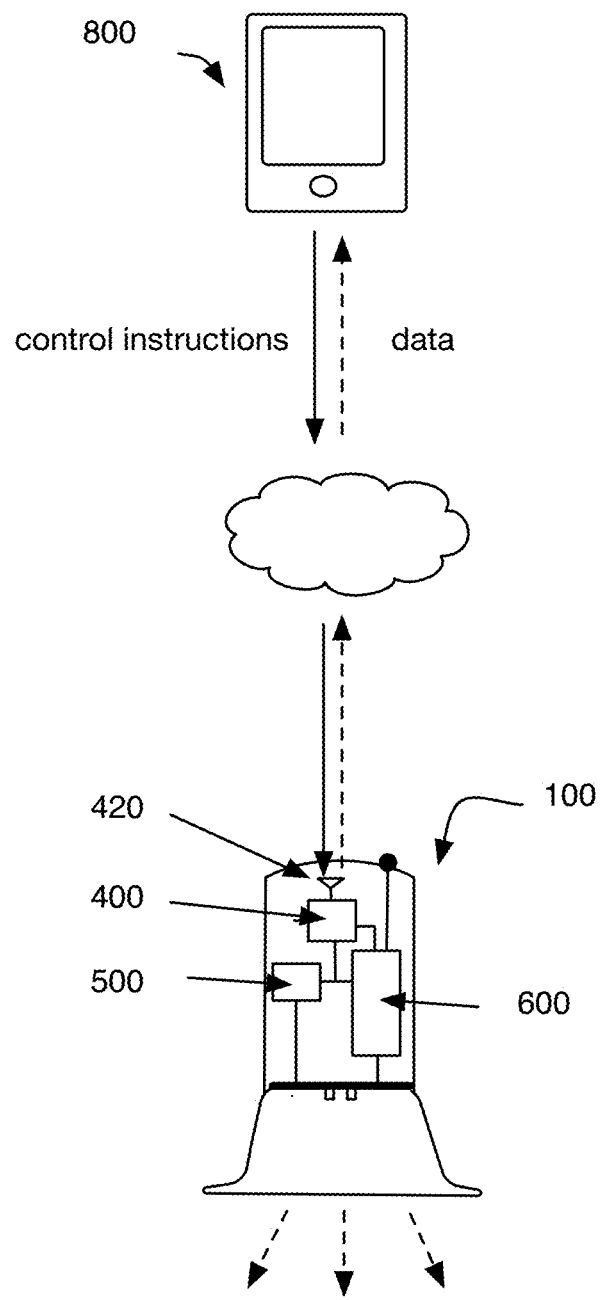
FIG. 2 is a schematic representation of an embodiment of the lighting system in operation.

In one example, lighting system operation is controlled based on instructions and/or data received from the device 800. As shown in FIG. 2, the data can be wirelessly received by the wireless communication module 400 from the device 800 (e.g., via a LAN, mesh network, etc.), and be processed by the onboard computing system 500, wherein the computing system 500 controls operation of the light emitting elements 340 based on the instructions. The instructions can be received from a user at the device 800, be automatically generated by the device 800 (e.g., based on auxiliary information, such as data received from a second connected system), or be otherwise generated. In another example, information originating from the lighting system 100 can be processed by the computing system 500 and transmitted back to the device 800 through the wireless communication module 400.

Figure 3:
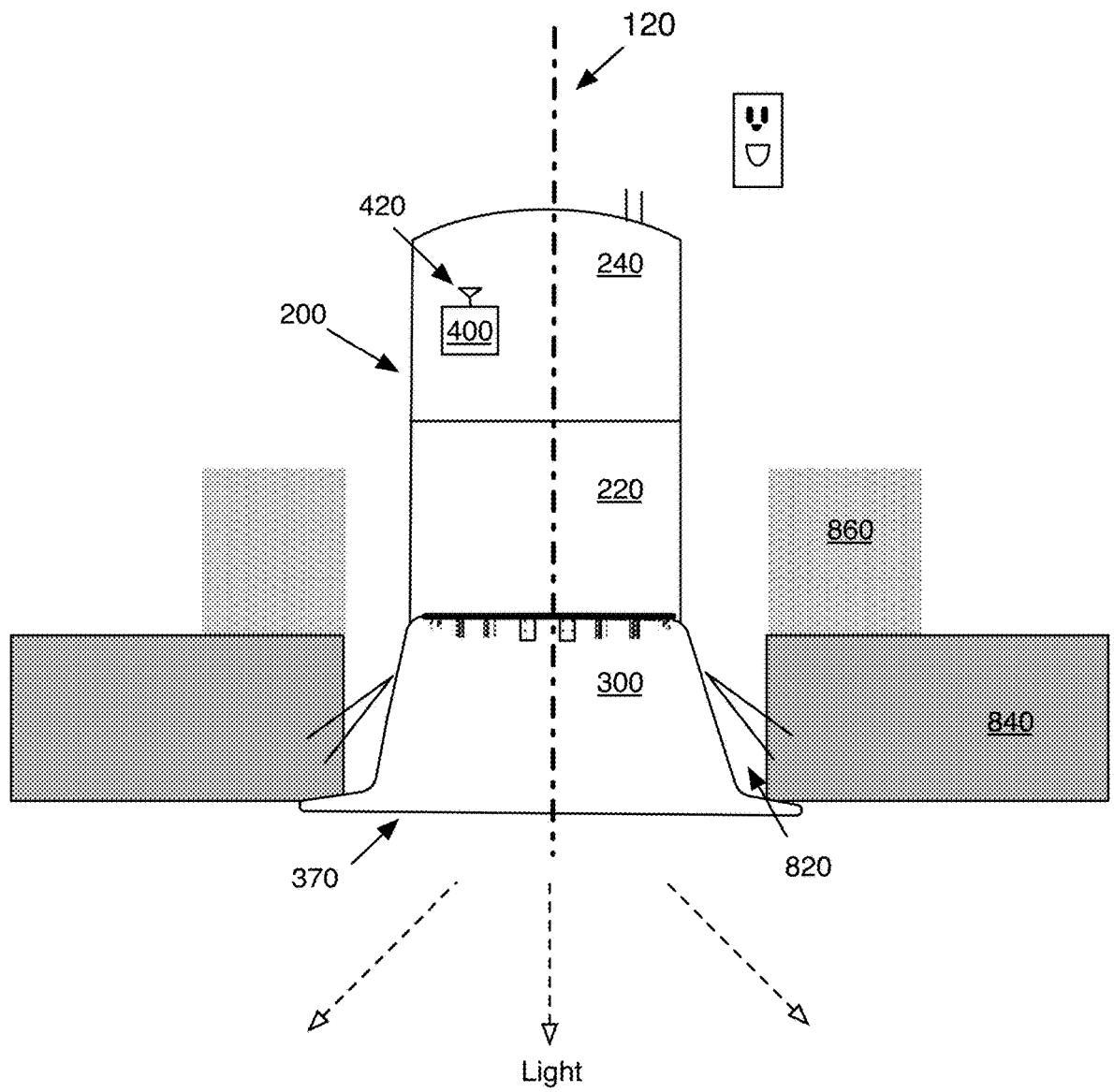
FIG. 3 is an installed example of the lighting system.

In an example shown in FIG. 3, the lighting system 100 is a downlight fixture and is configured to install into a recessed hole 820 in a mounting surface 840 (e.g., a ceiling) and preferably proximal ceiling insulation 860. The downlight can include: a housing module 200 including: a thermally conductive first housing end 220 (e.g., a heatsink) preferably extending beyond the length of the insulation 860, and opposing an RF-transparent second housing end 240; a lighting module 300 mounted to (and thermally connected to) the first housing end 220 opposing the second housing end 240, wherein the facing 370 is preferably exterior to the mounting surface 840; and a wireless communication module 400 (e.g., a radio or transceiver; a WiFi chipset; etc.) arranged within the housing interior 260 cooperatively defined by the first and second housing ends. The first and second housing ends also cooperatively define a housing exterior 280 and a longitudinal axis 120, wherein the lighting module 300, the first housing end 220, and the second housing end 240 are coaxially aligned along the longitudinal axis 120. The wireless control module 400 includes an antenna 420, and is arranged within the housing interior 260 with the antenna 420 proximal and/or encapsulated by the second housing end 240.

Figure 4:
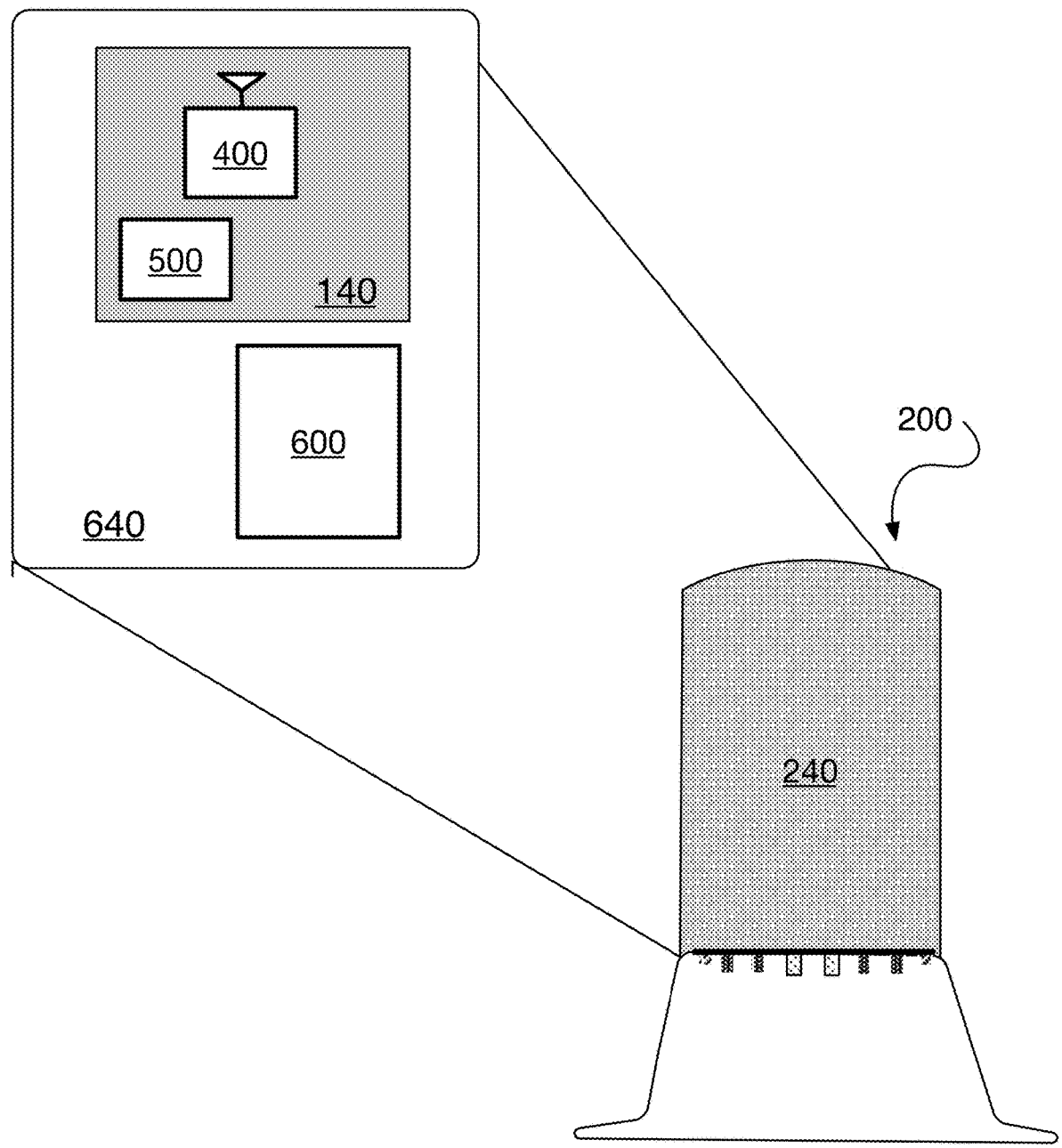
FIG. 4 is an example of the electronic components within the lighting system.

In this example, as shown in FIG. 4, the downlight can include a computing system 500 and a power supply unit 600, wherein the wireless control module 400, computing system 500, and the power supply unit 600 can be arranged on the same circuit board 640 (e.g., PCB). The common circuit board is preferably located in the housing interior 240, but can alternatively be located within the reflector, mounted to the first end of the housing, or otherwise arranged. In a specific example, the wireless control module 400 and the computing system 500 can be integrated together on a first circuit board 140 (e.g., LCM), wherein the first circuit board is preferably arranged proximal or mounted to a secondary circuit board (e.g., power board 640).

Figure 5:
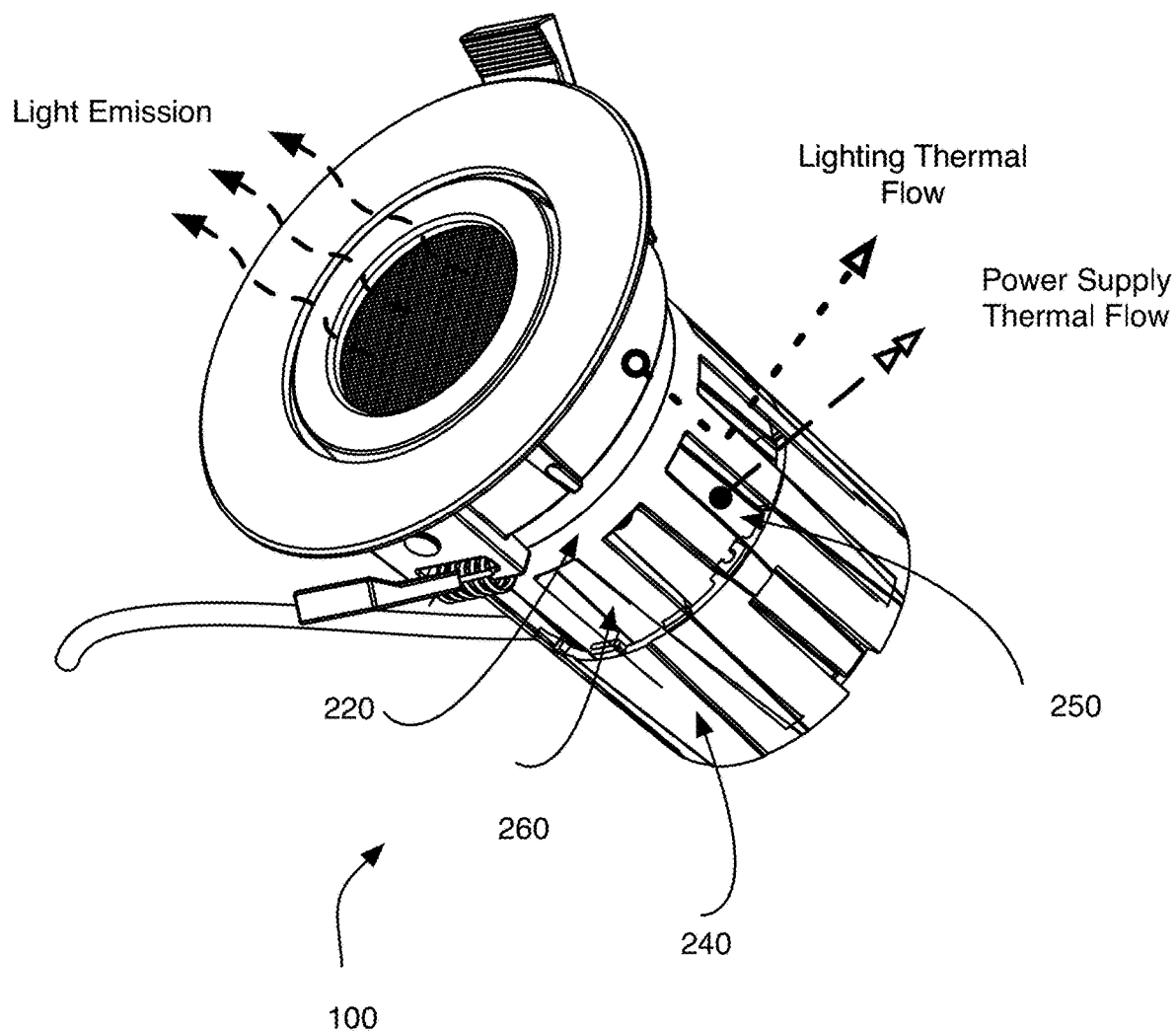
FIG. 5 is a schematic representation of thermal flow throughout an example of the lighting system.
Figure 6:
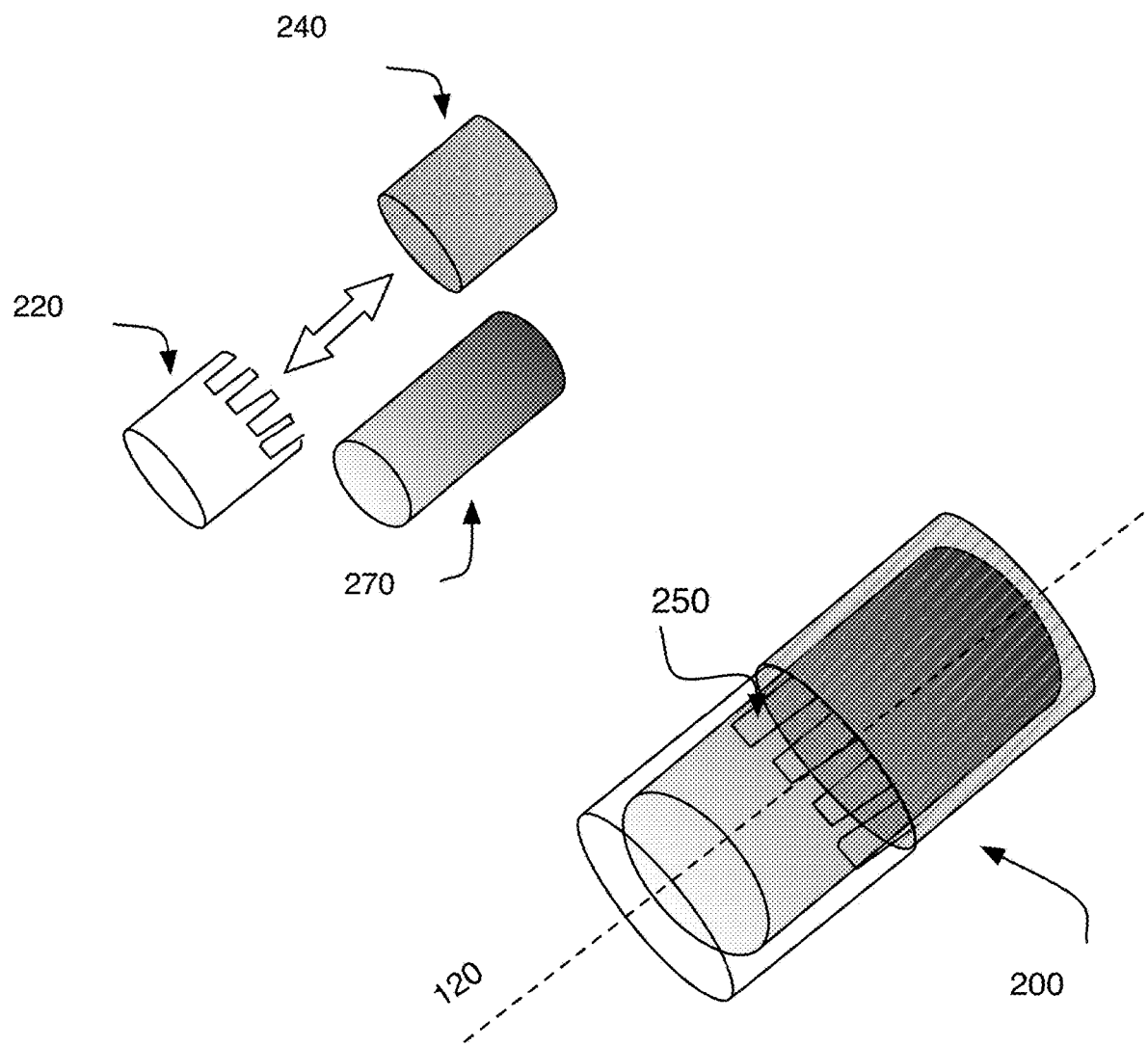
FIG. 6 is a schematic representation of an example of the housing of the lighting system.

In this example, as shown in FIG. 5, the housing module 200 can additionally include a set of air flow channels 250 thermally and/or fluidly connecting the housing interior 260 with the ambient environment. The air flow channels 250 are cooperatively defined by the first and second housing end, and radially extend from the housing interior 260, through the housing wall thickness, to the housing exterior 280. As shown in FIG. 6, the downlight can optionally include an insulative sleeve 270 within the housing interior 260 that mounts the wireless communication system and/or other heat-generating components (e.g., power converter, processing unit, common circuit board, etc.). The insulative sleeve 270 can: mechanically protect the internal components (e.g., wireless communication system, power converter, processing unit, etc.), thermally connect the internal components to the air flow channels 250, and/or thermally insulate the thermally conductive first housing end 220 and/or lighting module components from the internal components.

Figure 8:
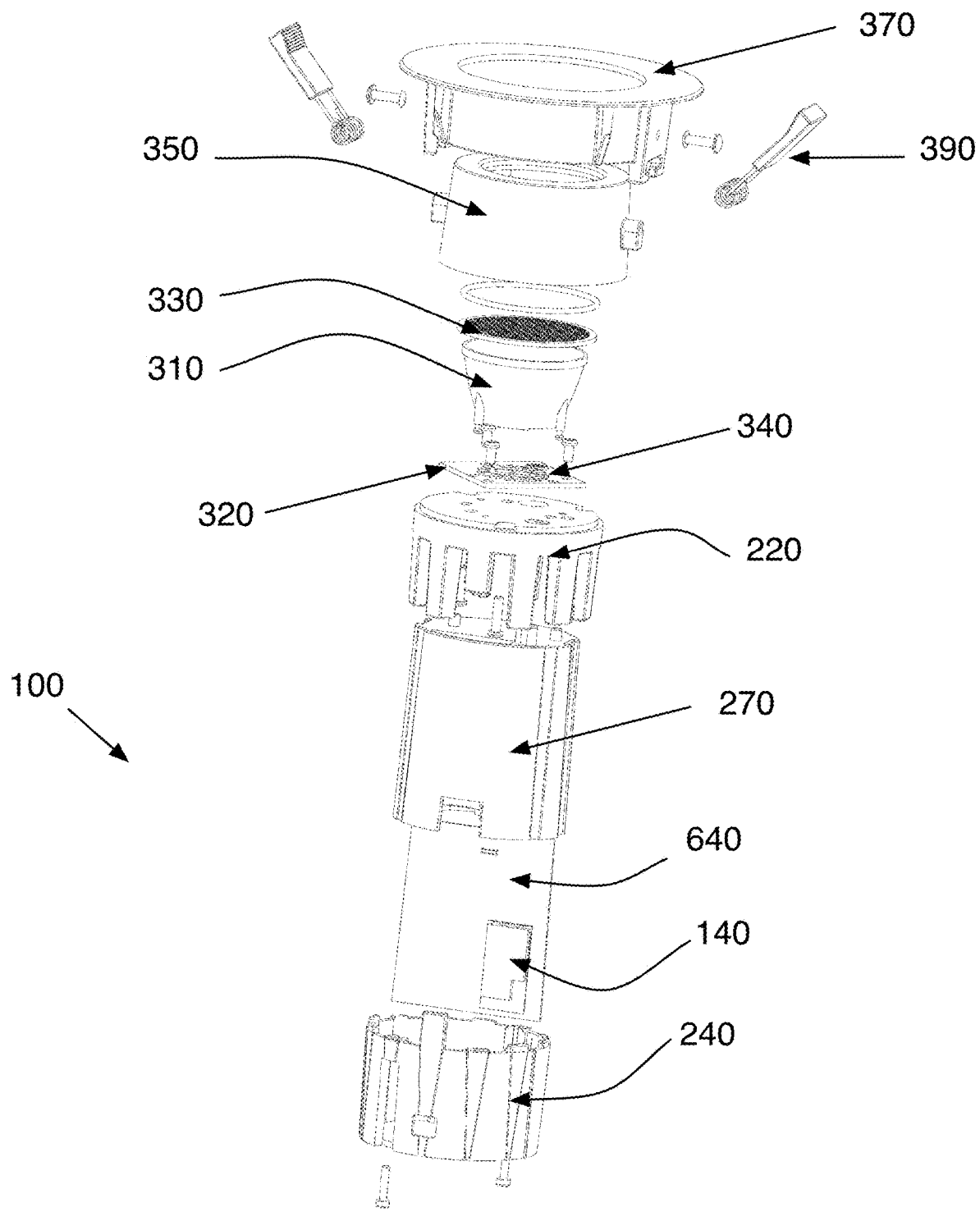
FIG. 8 is an exploded view of an embodiment of the lighting system.

In this example, the downlight can additionally include: a facing 370 mounted to the first housing end 220; a mounting mechanism 390 attached to the facing 370 (e.g., spring clips). The downlight can optionally include a swivel body 350 that is statically mounted to the housing module 200 (e.g., the first housing end 220, such as the exterior of the first housing end 220) and rotatably mounted to the facing 370 (e.g., the facing interior), which enables the downlight body (e.g., the components encapsulated by the housing) to rotate relative to the facing 370 and/or mounting surface. An exploded view of this specific embodiment is shown in FIG. 8.

In a specific example, the downlight can be 4 inches wide×4 inches deep×4.17 inches tall (e.g., 105 mm), with a 3.54 inch cut out. In this specific example, the downlight can be configured to fit into a 90 mm cut out. However, the downlight can have any suitable dimensions.

The lighting system 100 can be used with a set of devices 800, which function to transmit control instructions to the lighting system 100 and/or receive lighting system data from the lighting system 100. The device 800 is preferably a remote device (e.g., not connected to the same communication network or LAN as the lighting system 100), but can alternatively be a local device (e.g., connected to the same communication network or LAN as the lighting system), a device directly connected to the lighting system 100 (e.g., via a wired connection, a LAN hosted by the device 800 or lighting system 100, etc.), or be otherwise situated. The device 800 can be a server system (e.g., associated with a lighting system management entity, the lighting system manufacturer, a third party intermediary, etc.), a smartphone, tablet, computer, or be any suitable device.

3. Benefits

Variants of the lighting system 100 can confer several benefits over conventional lighting systems. First, by using modern light emitting elements 340, such as LEDs, variants of the lighting system 100 can decrease power consumption, increase lighting system lifespan, and, in some variants, reduce the cooling requirement for the light emitting elements over conventional lighting solutions. This results in reduction of costs, which is desirable to consumers. Furthermore, some variants of the lighting module 300 may include additional components such as a reflector, a diffusor, or a swivel body, which function to control desired lighting effects (e.g., lighting patterns, dynamic lighting, rotational lighting).

Second, by incorporating a wireless communication module 400, variants of the lighting system 100 can enable remote individual and/or group control of lighting without physical or manual user input (e.g. power provision via a switch) to present instructions to the light emitting elements 340. The wireless communication module 400 can additionally enable the information routing, remote controllability, or any other suitable communication between one or more user devices with one or more connected or unconnected (e.g., conventional) lighting systems that are in operation. Furthermore, the wireless communication module 400 can provide connectivity infrastructure capability in a light fixture form factor, which can be installed into a commercial or residential building. This can enable a building to include built-in connectivity infrastructure (e.g., wireless internet routers, nodes, network extenders, etc.) without the need for additional components, or the need to house such additional components in building compartments (e.g., network closets).

Third, incorporating a the wireless communication module 400 into the lighting system 100 enables remote individual and/or group control of lighting systems 100 without utilizing centralized control (e.g., of power provision via a switch) or additional hardware (e.g., a control hub) to transmit instructions to the light emitting elements 340. An all-in-one connected lighting fixture may be more desirable to consumers due to ease of use and reduced number of separate components. The onboard wireless communication module can further enable interaction with and/or control the lighting system using voice control (e.g., via Alexa integration, Google Home integration, etc.). Furthermore, incorporating an onboard computing system 500 (that converts the remote control instructions into lighting system control instructions) into the lighting system 100 may improve performance and capability of operation (e.g., advanced or dynamic lighting effects, faster responses to sensor triggers, etc.), enable data storage (e.g., energy use and operational history), or enable more rapid provision of feedback to the user.

Fourth, variants of the lighting system 100 incorporating a power supply unit 600, preferably including a battery 620, can provide backup power to the lighting system components when power provision from the primary power source xx has ceased (e.g., when an electrically connected light switch is in an off or disconnected position). For example, the power supply unit 600 can power on-board digital memory, such that settings for light emitting element operation can be stored and retrieved. In a second example, the power supply unit 600 can power the wireless communication module 400, such that wireless or wired communication with the lighting system 100 is enabled despite primary power cessation. In a third example, the power supply unit 600 can power the light emitting elements 340, such as during an emergency event.

Fifth, incorporation of additional sensors 700 that can sense features of an ambient environment (e.g. motion, sound) can provide context-responsive lighting. For example, in variants including motion sensors, human presence can be detected and light selectively emitted in regions in response to human presence detection (e.g., motion detection, user device connection to a shared LAN, etc.). In another example, in variants including one or more microphones, voice control processing can be performed onboard (e.g., the computing system 500), remotely (e.g., by a connected computing system), or in any other suitable manner.

Sixth, some lighting system configurations can manage the thermal properties of the lighting system 100. For example, some arrangements of higher heat output and lower heat output components within the lighting system 100 can confer benefits over conventional systems. In particular, the higher heat output and lower heat output components can be strategically arranged about the housing module 200 to generate heat gradients that facilitate natural convection. In one example, the higher heat output components, such as the light emitting elements 340, can be arranged above the lower heat-output components and/or heat-sensitive components.

In another example, some lighting system configurations thermally protect heat-sensitive components, such as LEDs, from heat-generating components, such as the power converter, processor, and wireless communication system. In particular, these lighting system variants separate the heat-sensitive components (e.g., LEDs) from the heat-generating components with a heatsink, which cools the heat-sensitive components (e.g., by arranging the heat-sensitive components on the opposite side of the heatsink from the heat-generating components). Some variants can further promote cooling by having heatsinks that extend beyond the thermal insulation of the mounting surface (e.g., regulatorily-required ceiling insulation). Some variants can further thermally protect the heat-sensitive components by including a thermally insulative layer between the heat-generating components and the heatsink (e.g., the sleeve 270).

Other variants can obtain the benefits of the aforementioned thermal separation while still enabling low-EMI wireless communication. In particular, these variants can include an RF-translucent (or transparent) second housing end, and arrange the antenna of the wireless communication module within the second housing end. In the specific example wherein the lighting system is a downlight, this would place the antenna within the ceiling headroom. The inventors have discovered that this antenna placement can be acceptable, particularly when the lighting system is connected to grid power. In particular, low signal receptivity, high packet loss, high SNR, or other connectivity problems can be resolved, in some variants, by dynamically increasing or otherwise adjusting the power supplied to the wireless communication system.

4. System

The housing module 200 of the lighting system 100 functions to mechanically protect, enclose, or retain the lighting system components. The housing module 200 also functions to provide structural support and integration of any components of the system into a single unit, for example, to provide a mounting point for the lighting module 400. The housing module 200 also functions to thermally manage heat generated by the lighting system components. For example, the housing module 200 can conduct heat from the components to the ambient environment, to a heat transfer fluid 101 (e.g., cooling fluid, such as a coolant, phase change material, or ambient air), or to any other suitable cooling medium.

The housing module 200 preferably defines a cylindrical prism with a circular base, but can alternatively be rectangular prismatic, trapezoidal prismatic, or be any suitable volumetric shape. The housing module 200 preferably includes a perimeter (e.g., perimeter of the base, perimeter of the body), but can alternatively define an edge (e.g., interface between the base and a sidewall, etc.), or any other suitable feature. The diameter of the housing module 200 is preferably sized according to a standardized fixture diameter (e.g., four inches, six inches) but can alternatively be sized according to any suitable diameter or dimension. The length of the housing module 200 is preferably sized according to a regulatory headroom limitation (e.g., a vertical space limitation between the visible ceiling and a floor above the ceiling, a regulation limiting the depth that a light fixture can project vertically into a ceiling space, etc.) but can alternatively be any suitable length. For example, the length (e.g., height) of the housing module 200 can be between 50 mm-120 mm, 100 mm, 105 mm, or be any suitable length.

All or a portion of the housing module 200 is preferably thermally conductive. Different portions of the housing module 200 preferably have different thermal conductivity values, but can alternatively have the same thermal conductivity value. For example, all portions of the housing module 200 can be thermally conductive, or a subset of the housing module 200 can be thermally insulative, have different thermal properties (e.g., different thermal conductivity values), or have any other suitable thermal property. Thermally conductive housing module portions are preferably made from metal (e.g., aluminum alloys, copper alloys, stainless steel, etc.), but can alternatively or additionally be made from diamond, composites (e.g., ASiC, dymalloy, etc.), metal-coated plastics, or any other suitable material. Thermally insulative portions or portions with low thermal conductivity can be made from polymers (e.g., plastics), ceramics, foam, or any other suitable material.

In one variation, the first housing end 220 has a first thermal conductivity value, and the second housing end 240 has a second thermal conductivity value equal to or less than the first thermal conductivity value. However, the second thermal conductivity value can be higher than the first thermal conductivity value, dynamically vary as a function of the first thermal conductivity value, or be otherwise related to the first thermal conductivity value.

All or a portion of the housing module 200 is preferably transparent to a set of RF (radiofrequency) wavelengths, which can reduce EMI (electromagnetic interference). The RF-transparent housing portions preferably have low loss and/or low diffraction (e.g., a low dielectric constant, such as that of glass, fiberglass, phenolic resins, PVC), but can alternatively have high loss, high diffraction, or any other suitable property. Different portions of the housing module 200 can have different RF-translucency values, but can alternatively have the same RF-translucency values. All or a portion of the housing module 200 can be transparent to the same or different RF frequencies or wavelengths. For example, a portion of the housing module 200 can be substantially transparent (e.g., with less than 20% loss, 10% loss, 5% loss, etc.) to frequencies and/or wavelengths used by wireless communication standards (e.g., IEEE 802.11, ISO/IEC 18000-3, etc.), such as the 2.4 gigahertz, 5 gigahertz, 5.8 gigahertz, or 13.56 megahertz radio bands. However, the housing module 200 can have any other suitable transparency to any other suitable set of radio frequencies (e.g., 20 kHz to 300 gHz). RF-transparent housing module portions can be made from polymers (e.g., plastics) glass, resins, or any other suitable material. The housing portions that are RF-transparent are preferably different from the housing portions that are thermally conductive, but can alternatively be the same portions. RF-opaque portions or portions with high RF loss and/or diffraction can be made from polymers (e.g., Teflon™), metals, or any other suitable material.

In one variation, the first housing end 220 has a first RF-transparency value, and the second housing end 240 has a second RF-transparency value equal to or higher than the first RF-transparency value. However, the second RF-transparency value can be lower than the first RF-transparency value, dynamically vary as a function of the first RF-transparency value, or be otherwise related to the first RF-transparency value.

The housing module 200 preferably includes a first housing end 220 and the second housing end 240, but can alternatively or additionally include any other suitable housing component. The housing module 200 is preferably constructed from two separate pieces (e.g., a first housing end piece and a second housing end piece), but can alternatively be formed from a single piece that is cast, molded, machined, printed, or otherwise manufactured.

The first and second housing ends preferably cooperatively define a housing interior 260 that receives a portion of the wireless communication module 400 and the power supply unit 500, and can optionally include openings for electrical, antennae, and/or thermal feedthroughs at either end.

The first housing end 220 of the housing module 200 functions to mount the lighting module 300, and can optionally function as a thermal regulator for the lighting system components. In particular, the first housing end 220 functions to cool heat-generating components such as the light emitting elements 430. The first thermal conductivity value (e.g., K-value) is preferably higher than 0.024 W/mK, more preferably between 50 W/mK and 1000 W/mk, but can alternatively be lower or be any suitable value. Additionally or alternatively, the first housing end 220 can have a first thermal resistivity value (e.g., higher than, equal to, or lower than the second thermal resistivity value of the second housing end 240). The first thermal resistivity value (e.g., R-value) is preferably lower than 1.00 hr·ft2·° F./Btu, but can alternatively be higher. The first end can be formed from metal (e.g., aluminum, copper, steel, gold, composites, etc.), but can alternatively be formed from thermally conductive polymers (e.g., polymers including heat-conductive additives or coatings, such as graphite carbon fiber, aluminum nitride, boron nitride, or metals, or any other suitable thermally conductive material. In one variation, the first housing end 220 is preferably a thermally conductive heat sink.

The first housing end 220 preferably has a height (and/or length) that is greater than the facing height and/or greater than the regulatory insulation height (e.g., specified by building code for geographic region). In one example, the combined height of the facing and heat sink is greater than the regulatory insulation height (e.g., exceeds 10 mm, 20 mm, and between 10 mm and 40 mm, etc.). However, the first housing end 220 can alternatively can have any suitable height.

In one variation, the first housing end 220 is an open-ended cylindrical prism with solid walls. In a second variation, the first housing end 220 includes a set of radial fins extending away from the lighting module substrate 420. In a third variation, the walls of the first housing end 220 define crenellations or teeth extending parallel the longitudinal axis, towards the second housing end, from the perimeter of the cylinder base. The length of the teeth, including the base, is preferably at least 30 mm, but can alternatively be of any suitable length. The spacing between adjacent teeth can be between 1 mm-30 mm wide, 5 mm wide, 10 mm wide, be a predetermined percentage of the housing perimeter (e.g., 5%, 10%, etc. per space or in total), or have any suitable dimensions. The spacing preferably extends along the length of the teeth, but can alternatively extend partway along the tooth length (e.g., wherein the teeth can be connected at a distal end), or be otherwise related to the teeth. However, the first housing end 220 can be otherwise configured.

The first housing end 220 is preferably positioned adjacent and thermally connected to the light emitting elements 430 and/or mounted to the lighting module substrate 420, but can be otherwise arranged (example shown in FIG. 5). In this variation, the substrate is a more efficient thermal conductor than other components surrounding the light emitting elements 430, but can be a less efficient thermal conductor, or have any suitable relative thermal conductivity.

The first housing end 220 preferably opposes and adjoins the second housing end 240 (example shown in FIG. 6), but can be otherwise arranged. The first housing end 220 and the second housing end 240 are preferably coaxially aligned along longitudinal axis 120, but can alternatively be aligned along a different axis (e.g., a lateral axis, rotational axis, etc.), aligned offset from each other, or otherwise arranged.

The second housing end 240 functions to couple to the first housing end 220, and cooperatively defines housing interior 260 to retain components, such as the wireless communication module 400, computing system 500, and the power supply unit 600. The second housing end 240 (e.g., end cap) can optionally provide an RF-translucent housing segment for low-interference wireless transmission and/or reception. The second housing end can additionally function to thermally couple to heat-generating components, such as the power supply unit 600, or any other suitable component, and conduct heat from the components to the remainder of the housing 200.

In one variation, the second housing end is shaped as a cylindrical prism open at one end opposing the first housing end. However, the second housing end 240 can be otherwise configured.

Housing module components formed from plastic can be preferred in some variations to reduce electromagnetic interference with the antenna 320, which is preferably positioned closest to the second housing end 240. In one variation, the second housing end 240 is RF-transparent and has a second thermal conductivity value that is preferably equal to or less than the first conductivity value of the first housing end 220. Specifically, the second housing end is formed from a thermally conductive polymer with a thermal conductivity value 10-50 times higher than a base thermoplastic (e.g., 10-100 W/mK), 100-500 times higher than a base thermoplastic (e.g., 10-100 W/mK), or has any other suitable thermal conductivity. However, the second housing end 240 can have any other suitable set of thermal and/or RF properties.

In some variants, the first and second housing ends cooperatively define a set of air flow channels 250 along the housing exterior 280. The set of air flow channels 250 of the housing module 200 function to create a thermal path for passive cooling between the housing interior 260 and the housing exterior 280. The cooling fluid is preferably gaseous, but can alternatively be liquid. The cooling fluid can be air (e.g., from the ambient environment), water, coolant, phase change material, or any other suitable cooling fluid. The channels 250 preferably extend along the longitudinal axis of the housing module 200 (e.g., extend in parallel with the longitudinal axis 120), but can alternatively extend in a spiral about the housing longitudinal axis, extend perpendicular to the longitudinal axis (e.g., arcuately), or extend in any other suitable configuration. The channels 250 are preferably evenly distributed about the housing exterior 280, but can alternatively be unevenly distributed. In one variation, the channels 250 extend longitudinally along the housing (example shown in FIG. 5). In a second variation, the channels 250 extend arcuately, about the housing. In a third variation, the channels 250 extend radially throughout the housing thickness. However, the channels 250 can be otherwise configured.

The set of channels 250 can be formed from perforations (e.g., through holes or openings) in the housing module 200. The channels 250 can be formed by the first housing end 220 or the second housing end 240, or otherwise formed. In one example, the channels 250 can be formed when one or both ends have a set of teeth, wherein the spacing between the teeth forms the channels. The channels 250 are preferably cooperatively defined by the first housing end 220 and the second housing end 240, but can alternatively be defined by a sleeve 270, a through hole formed within the first housing end 220, within the second housing end 240, within the sleeve 270, or defined in any other suitable component. The cooling channel walls can be smooth or textured (e.g., includes bumps, divots, grooves, protrusions, fins, etc.). In one variation, the set of channels is formed by thermally conductive segments defined in the housing module (e.g., metal bars embedded within the housing). In one example, the housing module is formed by a solid piece with patterned geometries or inconsistencies (e.g., grooves) in the surface. In a second example, the first housing end has a different thermal conductivity from the second end of the housing.

The housing module can additionally include a sleeve 270, which functions to support, receive, and/or mechanically protect components. The sleeve 270 can optionally function to thermally isolate components within the housing interior 240 from the heat sink, such as the circuit board xx, the wireless communication module, the computing system, and the power supply unit, or any other suitable functionality. The sleeve is preferably thermally insulative (e.g., has a thermal conductivity value of less than 10 W/mK, etc.), but can alternatively be thermally conductive. However, the sleeve can have any other suitable thermal property. The sleeve can be made from plastic (e.g., a polymer), ceramic, organic material (e.g., paper), or any other suitable material. The plastic can be thermally insulative (e.g., be a thermoplastic or thermoset, such as polysulfone, PEET, or any other suitable thermally insulative plastic). The sleeve is preferably a separate piece from the housing 200, but can alternatively be an integral (singular) piece with the housing.

The sleeve 270 is preferably a cylindrical prism with a single open end and a radius that does not exceed that of the housing module 200. The sleeve 270 preferably has a length that is less than or equal to the housing length, but can alternatively have any suitable length. In one variation, the sleeve 270 extends along the length of the housing interior. In a second variation, the sleeve 270 extends from the first housing end partway along the air channel length. The sleeve 270 is preferably coaxially arranged with the housing module 200 (e.g., along the longitudinal axis), but can alternatively be offset from the housing module 200, or otherwise arranged. However, the sleeve can alternatively have any other suitable configuration and/or arrangement.

Figure 7:
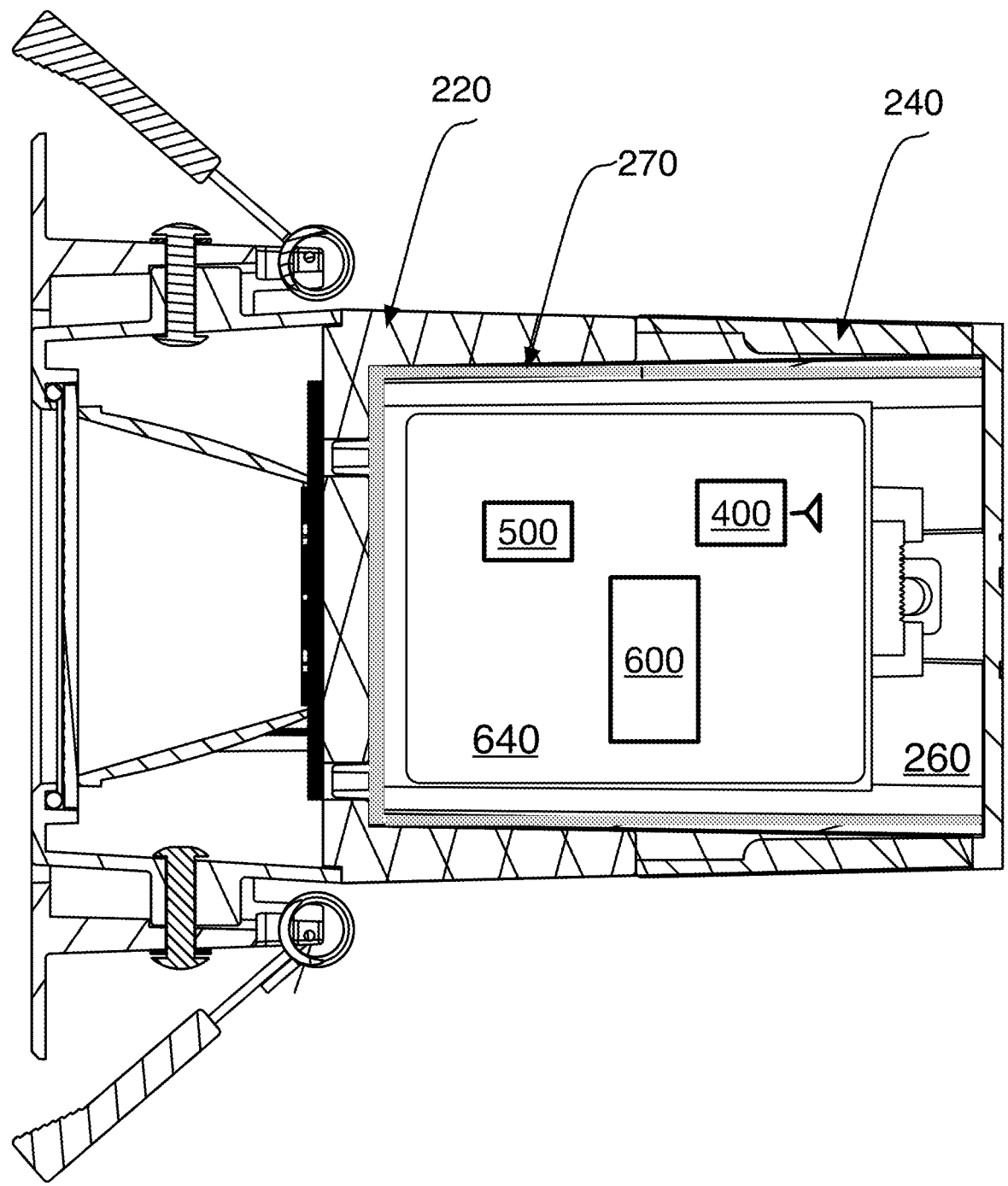
FIG. 7 is a cross-sectional view of an embodiment of the lighting system along a sagittal plane.

In one embodiment, shown in FIG. 7, the sleeve 270 is preferably positioned within the housing interior 260 proximal the first and second ends of the housing, and encloses the power supply unit 500, computing system 600, and the wireless communication module 300 therein. The sleeve may alternatively or additionally include a mounting point for components within the housing, and/or provide an alignment guide such as grooves, protrusions, or other alignment features to adjoin the first and second end assembly. The sleeve 270 can additionally include retention features for the circuit board, such as hooks, grooves, clips, threading, or any other suitable retention feature. The sleeve can additionally or alternatively include any other suitable features.

The sleeve may additionally or alternatively function to define air flow channels with the first and second housing ends. In one example, the sleeve is fluidly connected to the ambient environment through the spacing of the heat sink teeth.

Figure 9:
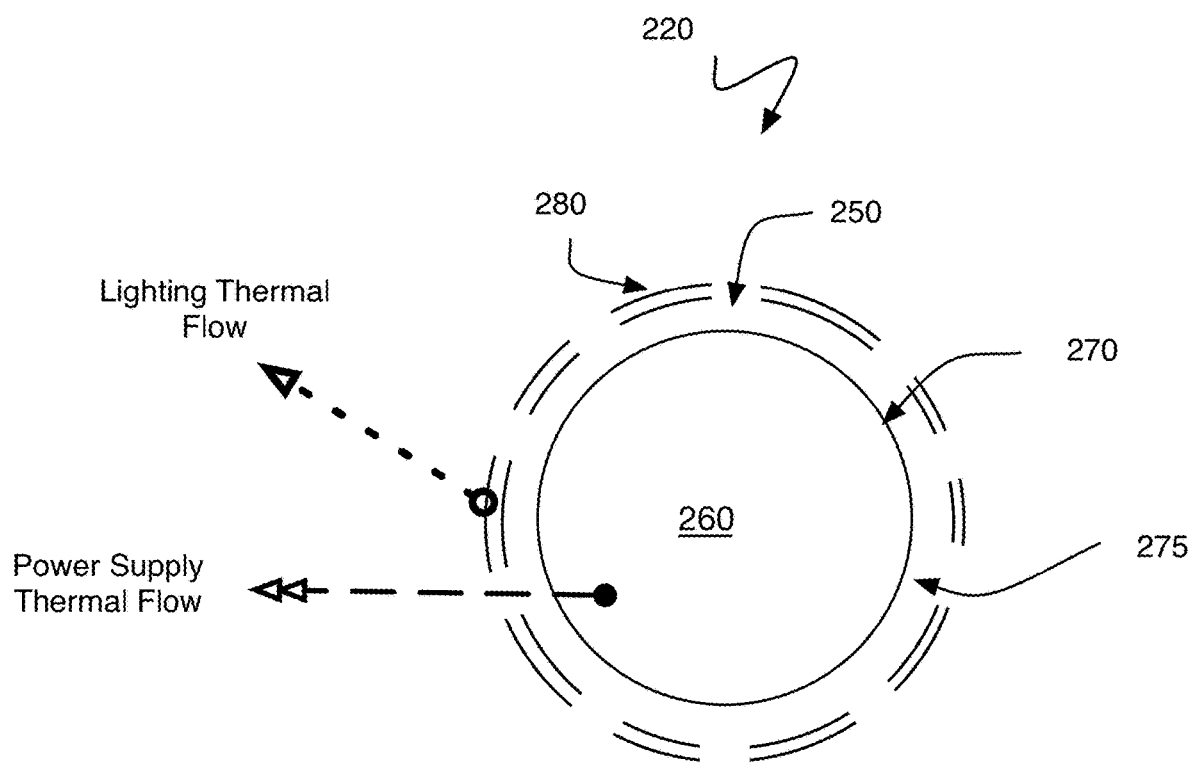
FIG. 9 is a cross-sectional view of an embodiment of the lighting system along the transverse plane.

In another example, as shown in FIG. 9 the spacing between the sleeve and the interior wall of the housing forms an air gap 275 through which air flow can occur (to form enclosed cooling channels).

The lighting module 300 of the lighting system 100 functions to emit electromagnetic radiation (e.g., light). The lighting module is preferably controlled based on instructions received from the wireless communication module 400 and computing system 500, but can be otherwise controlled. The lighting module includes a substrate 320 mounted to light emitting elements 340, and can optionally include a reflector 310, a diffuser 330, a swivel body 350, a facing 370, and a mounting mechanism 390. However, the lighting module can include any suitable set of components.

The lighting module 300 is preferably mounted to the first housing end 220, but alternatively is mounted to the reflector 310, wherein the reflector 310 is mounted to the first housing end 220. The lighting module 300 is preferably mounted to a planar face of the first housing end 220 (e.g., a face opposing the second housing end 240), but can alternatively be mounted to a side of the first housing end 220, the second housing end 240, or to any suitable portion of the housing. The lighting module 300 is preferably mounted to the housing exterior 280, but can alternatively be mounted to the housing interior 260.

The lighting module 300 is preferably electrically connected to and powered by the power supply unit 600, but can be otherwise powered. The lighting module 300 is preferably electrically connected to and controlled by the computing system 500, but can be otherwise controlled. The lighting module is preferably communicably connected to the wireless control module 400 (e.g., via the computing system 500), but can be otherwise connected to the user device. In variants where the lighting module 300 is connected to components within the housing module 200, the lighting module 300 is preferably connected by a wired connection, but can alternatively be connected by a pin connector, be wirelessly connected, or be otherwise connected. Physical connections (e.g., wired connections, pin connectors, etc.) preferably extend through a hole in the housing module 200 (e.g., a hole in the first housing end 220, a hole in the flat face of the first housing end 220, etc.), but can alternatively wrap around the housing exterior 280, be defined by the housing module 200 (e.g., wherein the housing module 200 includes an integrated connector), or be otherwise defined.

The substrate 320 of the lighting module 300 functions to thermally connect light emitting elements 340 to the housing module 200, more preferably the first housing end 220 but alternatively any suitable portion of the housing module 200. The substrate 320 preferably includes a first face (first substrate face), which mounts the light emitting elements 340, and a second face (second substrate face), which is in contact with the housing module 200. In one variant, the substrate is a metal core printed circuit board (MCPCB), but alternatively can be any suitable circuit board. The geometry of the substrate is preferably rectangular, but can alternatively be circular, triangular, or any other suitable shape. The substrate can optionally include thermal paste (e.g., arctic silver) or other thermal contact material on the second face to increase the thermal contact between the second face and the first housing end 220. However, the substrate can be otherwise configured.

The light emitting elements 340 function to emit light of pre-determined wavelengths or a range of wavelengths, and may be operated individually, as a group. In a preferred embodiment, a plurality of light emitting elements 340 mounted on a substrate 320 are arranged between the facing 370 and the housing module 200 and connected to the housing module 200 by way of a heat sink at the first housing end 220; however, a single lighting element may also be used, and the light emitting elements 340 can be arranged anywhere within the lighting system 100. The light emitting elements 340 preferably emit visible light (e.g., white light, colored light), but can alternatively or additionally emit invisible light (e.g., light outside of the visible spectrum), such as IR or UV. In one variation, the light emitting elements 340 are LEDs, but alternatively they can be any type of light emitting source, such as halogen or CFL bulbs. The light emitting elements 340 can be individually indexed and controlled by the computing system 500, indexed and controlled in sub-groups (e.g., in pairs), indexed and controlled as a group, or otherwise indexed and controlled. In an example wherein the light emitting elements 340 include both visible-light emitting elements and invisible-light emitting elements, the visible-light emitting elements can be controlled as a singular group, and the invisible-light emitting elements can be controlled as a singular group. However, the light emitting elements 340 can be otherwise configured and/or controlled.

The reflector 310 of the lighting module 300 functions to modify the optical characteristics of the light emitted from the light emitting elements. For example, the reflector 310 can focus light, collimate light, diffuse light, reflect light, or otherwise adjust the optical characteristics of the light. For example, the reflector 310 can create a beam angle between 45° and 90°, a beam angle of 60°, or any suitable beam angle. In operation, light emitted from the light emitting elements 340 is reflected from the inner surfaces of the reflector 310, travelling down the length of the reflector 310 from the first open end to the second open end and passes through the diffuser 330. The reflector 310 can also cooperatively encapsulate light emitting elements with the diffuser 330. The reflector 310 is preferably a parabolic reflector, but it can be any other suitable shape, such as a conical frustum. The reflector 310 preferably includes two opposing open ends: a first open end encircling the light emitting elements 340 (e.g., wherein the light emitting elements and/or substrate are nested within the reflector 310 interior through the first open end), and a second open end preferably closed off by the diffuser 330. The radius of the first open end is preferably less than the radius of the second open end, but can alternatively be equal to or larger than the radius of the second open end. Alternatively, the reflector 310 can include a single open end and a single closed end opposing the open end, wherein the light emitting elements 340 can be mounted to the interior face of the closed end (e.g., face proximal the closed end). However, the reflector 310 can be otherwise configured. The reflector 310 is preferably aligned with the longitudinal axis 120 of the housing module 200, more preferably coaxially aligned with the longitudinal axis 120, but alternatively can be aligned offset the longitudinal axis 120, or otherwise arranged. In a variation, the first open end of the reflector is aligned coaxially with and mounted to the first housing end 220, and surrounds the light emitting elements 340 and the substrate 320, such that the light emitting elements 340 are directed towards the second open end of the reflector 310. In this variation, the second open end of the reflector 310 is preferably capped by the diffuser 330. However, the reflector 310 can be otherwise arranged.

The diffuser 330 of the lighting module 300 functions to modify the intensity distribution of light emitted from the light emitting elements 340 (e.g., diffuse light, scatter light, attenuate light, etc.). The diffuser 330 can also cooperatively encapsulate the light emitting elements 340 with the reflector 310. The diffuser 330 is preferably a thin disc with a radius that is complementary to that of the open end of the reflector 310, but can be otherwise configured. The diffuser 330 is preferably uniformly translucent; however the diffuser 330 may alternatively have a translucence gradient, or have a translucency that is dynamically adjustable by a control module (e.g., electrochromatic diffuser). The diffuser 330 is preferably aligned with the longitudinal axis 120 of the housing module 200, more preferably coaxially aligned with the longitudinal axis 120, but alternatively can be aligned with the reflector 310, be arranged within the emission path of the light emitting elements 340, or otherwise arranged. In a preferred embodiment, the diffusor 330 is mounted to the reflector 310 at the second open end of the reflector, but it can alternatively be mounted at any other location that is across from the light emitting elements 340 and opposing the housing first end 220.

The lighting module 300 can optionally include a facing 370. In an example wherein the lighting system 100 is a downlight, as shown in FIG. 3, the facing 370 of the lighting module 300 functions to cooperatively create an aesthetically pleasing interface with, and/or mount the lighting module to, a mounting surface 840 (e.g., ceiling, wall, lamp holder). The facing 370 is preferably an annular ring, but can alternatively be square or any suitable shape. The facing 370 preferably includes a facing height, wherein the facing height can be less than, equal to, or taller than the mounting surface's insulation thickness (e.g., more than 10 mm, 15 mm, etc.). The facing 370 can optionally define: a facing perimeter, an interior surface, an exterior surface, and/or any other suitable feature. The facing 370 is preferably concentrically aligned with the housing module 200 (e.g., coaxially aligned with the housing longitudinal axis 120), but can be offset or otherwise arranged. The facing 370 is preferably mounted to the first housing end 220, but can alternatively be connected to the lighting module 300, be mounted to a swivel body 350 that rotatably mounts the facing 370 to the housing module 200, mounted to the second housing end 240, or be mounted to any suitable portion of the housing module 200. In a first variant, the first housing end 220 nests within the facing 370, wherein the facing 370 mounts to the first housing end 220 (e.g., an arcuate surface of the first housing end 220). In a second variant, the facing 370 encloses the lighting module 300 and is attached to an edge of the first housing end 220.

The lighting module 300 can optionally include a mounting mechanism 390. The mounting mechanism 390 of the lighting module 300 functions to affix the lighting system 100 to the mounting surface 840, more preferably within a recessed hole, opening, or other enclosed space within a mounting surface (e.g., a wall, ceiling, etc.), but alternatively to any other suitable mounting surface or feature. In an example wherein the lighting system 100 is a downlight, the mounting mechanism 390 preferably provides a radial force between the facing 370 and the inside edge of a hole in a mounting surface, but alternatively can be any suitable mechanism to statically mount the lighting system 100 into a lighting fixture. The mounting mechanism 390 is preferably arranged on the exterior surface of the facing, perpendicular to the plane in which a radial bevel extends from the facing 370. However, the mounting mechanism 390 can be mounted to the facing interior surface, to the housing exterior 280 (e.g., to the first housing end 220, to the second housing end 240, etc.), or to any suitable portion of the lighting system 100. The mounting mechanism 390 may be evenly or unevenly distributed along the edges of the facing 370, but can alternatively be connected to any part of the housing module 200. The mounting mechanism 390 can include a set of spring clips, hooks, or any suitable mounting mechanism. The mounting mechanism 390 can include two mechanisms (e.g., two clips), or any suitable number of clips, which generate an opposing linear force against a surface of the mounting.

The lighting module 300 can optionally include a swivel body 350. The swivel body 350 functions to rotate the light emitting elements relative to the facing about a rotational axis that is perpendicular to the longitudinal axis 120 (e.g., pitches the light emitting elements relative to the facing), and additionally or alternatively enables the housing to move relative to the facing 370 on an axis that extends through the facing 370. Alternatively, the swivel body 350 can rotate the light emitting elements 340 and/or housing module 200 about the longitudinal axis 120, or otherwise enable lighting system actuation. Preferably, the swivel body 350 can rotate the entire lighting system 100, sans facing 370, relative to the facing 370, but can alternatively rotate only the light emitting elements 340, the substrate 320, and the housing module 100, or rotate any suitable component of the lighting module 300. The swivel body 350 can enable ±10° pitch, between ±0° and ±90° pitch, or any suitable angular range of motion.

The swivel body 350 can define an opening to receive the reflector 310, diffuser 330, the light emitting elements 340, and the lighting substrate 320, but can be otherwise configured. The swivel body 350 preferably encircles the reflector 310 and the light emitting elements 340, while mounting the facing 370 to the first housing end 220. In one embodiment, the swivel body 350 is rotatably connected to the facing 370 (e.g., at the facing interior surface) at two points along an axis perpendicular to the longitudinal axis 120, and is rigidly connected to the housing module 200 (e.g., at the first housing end 220, the second housing end 240, etc.) at an interface along the edge of the swivel body 350 (e.g., by fasteners, adhesive, molded clips). Alternatively, the swivel body 350 can be attached to the housing module exterior 280 (e.g., for track lighting). The swivel body 350 can include: a pin and groove mechanism, a pin and hole mechanism, a gimbal (e.g., passive or active), a motor, and/or any other suitable mechanism of attachment. The swivel body 350 can be manually actuated, actively controlled by the motor (e.g. based on control instructions received from the user device by the wireless communication module 400), or otherwise controlled.

In one example, variants of the lighting system 100 can determine and store the rotational and/or geographic position of the lighting module 300 relative to an external reference point (e.g., relative to the facing 370). The relative orientation and/or position of the lighting module 300 can subsequently or contemporaneously be used to determine the position of a desired illumination target relative to a reference point on the lighting system 100, and to determine each lighting element's position relative to the desired illumination target. As such, the lighting system 100 can be capable of directional lighting using only the light emitting elements 340 and a wireless communication module 400, using only the light emitting elements 340 and an ambient light sensor, using the swivel body 350, using only the wireless communication module 400, or any other suitable combination of components.

The wireless communication module 400 of the lighting system 100 functions to receive, translate, and forward instructions from the user device to the lighting system 100 to control light output via the onboard computing system 500. The wireless communication module 400 can additionally or alternatively transmit data to the user device and/or execute any other suitable communicative processes or actions. The instructions are preferably communicated to the lighting system 100 using a wireless network communication protocol (e.g., Zigbee; Bluetooth; NFC; WiFi, such as 802.11b,g,n; cellular; etc.), but can be communicated over a wired protocol (e.g., powerline, Ethernet, etc.) or otherwise communicated. The wireless communication module 400 preferably connects the lighting system 100 to a LAN network using a SSID, password, security keys, or other credentials stored by on-board memory. Additionally or alternatively, the wireless communication module 400 can directly connect to an auxiliary device (e.g., through a network hosted by the wireless communication module 400 or auxiliary device), or otherwise connect to the user device. In a first embodiment, the network communication protocol is WiFi, but alternatively, the wireless signals can be transmitted via a protocol that can operate using either short-range or long-range signals, or any other suitable wireless network communication protocol.

The wireless communication module 400 is preferably in bidirectional communication with the computing system 500, but can have one-directional communication with the computing system 500 (e.g., provide information to the computing system 500), or otherwise connected to the computing system 500. The wireless communication module 400 is preferably arranged on the same chip or circuit board 140 as the computing system 500, but can alternatively be arranged on a separate board.

The wireless communication module 400 includes one or more antennas 420 (e.g., dipole antenna, fractal antenna, whip antenna, monopole antenna, patch antenna, etc., and can optionally include one or more: radios (e.g., RF transceiver), chipsets (e.g., a system-on-chip), or any other suitable set of components. In a first variant, the antenna 420 and the radio are collocated on the same chipset. In a second variant, the antenna 420 and radio are distributed across the housing module 200 (e.g., mounted to separate portions of the lighting system) and connected by a set of wires. In one example of this variant, the radio can be positioned opposite the antenna 420, proximal the first housing end 220, wherein a wire extends between (and electrically connects) the radio and the antenna 420 through openings in the first housing end 220. However, the antenna 420, radio and/or any other suitable portion of the wireless communication module 400, can be arranged in any suitable fashion.

All or a portion of the wireless communication module 400 is preferably arranged inside the housing interior 220, but can alternatively be arranged on or integrated with the housing exterior 280, the lighting module substrate 320, the reflector 310, the diffuser 330, the facing 370, or otherwise arranged. The antenna 420 is preferably positioned proximal the RF-transparent housing portion (e.g., the second housing end 240), but can alternatively be arranged distal the first housing end 220 (e.g. distal a metal heat sink), along, within, or integrated to the sides of the housing module 200, the housing exterior 280, outside the enclosure cooperatively formed by the first housing end 220 and the second housing end 240, on the lighting module substrate 320, on the reflector 310, or arranged in any other suitable configuration in which the antenna 420 is communicatively accessible by a wireless signal (e.g., arranged near a non-metal wall of the housing).

The wireless communication module 400 is preferably coupled to (e.g., electrically connected to) the computing system 500 and the power supply unit 600, but can be connected to the lighting module 300 or any other suitable component. In one variation, shown in FIG. 4, the wireless communication module 400, the computing system 500, and the power supply unit 600 are arranged and collocated on the same circuit board (e.g., power board 640). Alternatively, each component can be arranged separately within the housing interior 260 or be grouped together in any suitable manner.

The computing system 500 of the lighting system 100 functions as a centralized information processing center for all data inputs and outputs to the lighting system 100, and functions to receive, translate, send, and store user instructions, or any other suitable data management function. In one variation, the computing system 500 interprets received instructions and/or collected sensor data, generates instructions for controlling light emitting elements 340 (e.g., based on the received instructions), sends and transmits instructions, or performs any other suitable computing task. The computing system 500 is preferably in communication with all elements of the lighting system 100, including, but not limited to: the lighting module 300, the wireless communication module 400, power supply unit 600, and the sensors 700.

The computing system 500 can include one or more processors (e.g., GPU, CPU, LCM, etc.) such as that described in U.S. application Ser. No. 14/937,774 filed 10 Nov. 2015, which is incorporated herein in its entirety by this reference, or any other suitable processor.

The computing system 500 can optionally include manual (e.g., non-automated, non-remote) control inputs (e.g., buttons, switches) to control system actions or operational state (e.g., turn off, turn on, reset system). In a specific example, depressing a reset button flush mounted within the facing 370 of the lighting system 100 for a time period (e.g., 2 seconds) reboots the computing system 500, upon which a tone is generated from an internal speaker. In another specific example, a status light emitting element positioned and or visible at the facing 370 of the lighting system 100 emits green light when the wireless communication module 400 is functioning normally and connected to the network, yellow light when it is powered but unconnected, and no light when the it is unpowered. The control input(s) can, additionally or alternatively, be otherwise configured.

The computing system 500 can optionally include memory for onboard data storage (e.g., flash memory, RAM, etc.), but it can also store data in a cloud database or any suitable data storage repository. Additionally or alternatively, the computing system 500 can be used in combination with other lighting system 100 components and/or external elements to implement the methods and/or processes described in U.S. application Ser. No. 14/512,699 filed on 13 Oct. 2014, U.S. application Ser. No. 14/542,312 filed on 14 Nov. 2014, and U.S. application Ser. No. 14/720,180 filed on 22 May 2015, each which is incorporated herein in its entirety by this reference. The computing system 500 can, additionally or alternatively, be otherwise operated or otherwise operate the lighting system 100.

The computing system 500 is preferably arranged onboard the lighting system 100, but can alternatively or additionally be remote from the lighting system (e.g., cloud computing system, central control hub). The computing system 500 is preferably arranged within the housing interior 260, but can alternatively be arranged along the housing exterior 280, or otherwise arranged. The computing system 500 is preferably arranged proximal the second housing end 240, but can alternatively be arranged proximal the first housing end 220, on the lighting module substrate 320 (e.g., along the first substrate face, between the substrate 320 and the first housing end 220, etc.), or otherwise arranged. The computing system is preferably aligned parallel the longitudinal axis 120; however, the computing system 500 can alternatively be arranged in any suitable manner relative to other components. In one embodiment, the computing system 500 is integrated on the same circuit board 140 (e.g., LCM2 chip coupled to a PCB) as the wireless communication module 400, but can additionally or alternatively be integrated into the power supply unit 600 or otherwise arranged. In one example, the computing system 500 and wireless communication module 400 are arranged on a common board (e.g., circuit board 140) or chipset, wherein the common board (e.g., circuit board 140) or chipset is mounted to the power supply unit's board 640 (e.g., IC, PCB, etc.). The circuit board 140 is preferably thermally isolated from the first housing end 220 (e.g., heatsink) by the housing sleeve 270 or by an airgap defined between the first housing end 220 and the housing sleeve 200; but can alternatively be thermally connected to the first housing end 220 (e.g., by the housing sleeve 270, by the housing module 200, etc.) or otherwise thermally connected to the first housing end 220.

Upon installation of the lighting system 100 into an electrical fixture or socket (e.g., recessed electrical box), the power supply unit 600 functions to deliver power to powered components, such as the lighting module 300, the wireless control module 400, and the computing system 500; and/or to convert grid power to power suitable for light emitting elements (e.g., target power, lighting power). The power supply unit 600 can additionally or alternatively power any other suitable portions and/or components of the lighting system 100. The power supply unit 600 includes one or more electrical connectors 620 (e.g., wires), and can optionally include a circuit board (e.g., power board 640, PCB, etc.), one or more batteries, one or more power converters (e.g., transformers, voltage converter, etc.), and/ or any other suitable power components. The power supply unit 600 is preferably arranged within the housing interior 260, wherein the housing ends have feedthroughs (e.g., openings, holes) for electrical connectors 620 to pass through to reach other components; however, the power supply unit 600 can alternatively be arranged outside the housing module 200 or otherwise located. Additionally and or alternatively, the power supply unit 600 can transfer power to powered components of the lighting system 100 wirelessly, without the use of electrical connectors 620, or in any suitable manner.

The electrical connectors 620 function to connect the lighting system 100 to a primary power source (e.g., external power, building power, powerline power, mains power), and can additionally function to provide electrical power directly to powered components of the system. Alternatively, the electrical connectors 620 can connect to one or more converters (e.g., AC-DC converters) and/or power regulators to convert the wall power to a suitable format (e.g., AC or DC, low voltage, medium voltage, high voltage, etc.) for delivery to powered components. Any number of electrical connectors 620 can be configured in any suitable power and/or data connector form factor (e.g., USB, barrel plug, etc.). At least one electrical connector is preferably accessible from outside the housing module 200 (e.g., via a feedthrough or set of feedthroughs in the housing module 200), in order to facilitate connection between the power source and the lighting system 100; alternatively, connection to the power source can be made to an electrical connector 620 residing outside the housing module 200 (e.g., via power pins that extend beyond the second housing end 240).

The power supply unit 600 can optionally include a power board 640 that functions to mount and/or support other components of the lighting system. In one embodiment, the wireless communication module 400 and the computing system 500 are integrated on the power board 640. In a second embodiment, the wireless communication module 400 and the computing system 500 are mounted to the power board 640. The power board 640 is preferably thermally insulated (or isolated) from the lighting module 300 and/or first housing end 220 by an airgap 275, sleeve 270, or other thermal insulation, but can alternatively be thermally connected to the first housing end 220. The power board 640 is preferably passively cooled, but can alternatively be actively cooled. The power board 640 can be cooled using the sleeve 270, the set of air flow channels 230 defined by the housing exterior 280, a coolant, or otherwise cooled.

The power supply unit 600 may optionally include one or more batteries (e.g., Li-ion, NiMH, etc.) that function to provide an additional or secondary power source, and additionally or alternatively, to provide surge protection to avoid damage to sensitive electrical components within the lighting system 100. In some variants, the batteries are preferably electrically connected to powered components of the lighting system 100, and can be arranged inside or outside of the housing module 200. The batteries are preferably thermally connected to a heat sink, such as the first housing end 220 (e.g., in variants wherein the first housing end 220 is a heatsink); but can alternatively be thermally isolated from the heatsink. The batteries are preferably removable or rechargeable, but can be otherwise configured. In some variants, each powered component of the lighting system 100 can have a corresponding battery with output characteristics (e.g., voltage, current, etc) tailored to that component; for example, the lighting module 300 can be connected to a lithium-ion polymer battery adapted for powering LEDs, and the computing system 500 can be connected to a button-type, low voltage, long lasting battery. Alternatively, the lighting system 100 can include a single battery for all or a portion of its components.

The lighting system 100 can optionally include sensors 700, which function to sample parameters of the ambient environment and can be used to collect environmental, contextual, or user input data and provide them to the computing system 500. The sensors are preferably communicatively coupled to the computing system 500 by any suitable connection (e.g., by data transfer connection, wired connection, wireless connection, etc.). Variants of the system may include any number or arrangement of optical sensors (e.g., CCD arrays, cameras), acoustic sensors (e.g., microphones), position sensors (e.g., encoders, etc.), pressure sensors (piezoelectrics), temperature sensors (e.g., thermocouples), or kinematic sensors (e.g., gyroscopes, accelerometers), or any other suitable sensors, arranged within the system depending on sensor purpose. In a first variant, ambient light sensors can be arranged on an outer surface of the lighting system 100 (e.g., outside of the facing 370, on the lighting module substrate 320, etc.) directed towards the space intended to receive emitted light. In a second variant, orientation sensors can be arranged along the longitudinal axis 120, to measure the angle of the housing relative to the facing 370. In a third variant, acoustic sensors may preferably sample the ambient environment through a manufactured hole or multiple holes in the housing module 200 or facing 370 of the lighting system 100. However, sensors can otherwise be arranged.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

I claim:

1. A connected downlight, comprising:
   a facing having a facing height;
   an external mounting mechanism mounted to the facing;
   a housing, comprising:
     a heat sink mounted to the facing, the heat sink having a first side, a second side opposing the first side, a first thermal conductivity value, and a heat sink height taller than the facing height;
     an RF-translucent end cap mounted to the second side of the heat sink and coaxially aligned along a longitudinal axis with the heat sink, the RF-translucent end cap having a second thermal conductivity value; and
     a set of cooling channels cooperatively defined by the heat sink and the end cap, the set of cooling channels fluidly connecting a housing interior with a housing exterior;
   a lighting module comprising:
     a substrate mounted and thermally connected to the first side of the heat sink; and
     a plurality of light emitting elements mounted to the substrate; and
   a wireless communication module comprising an RF antenna, the RF antenna arranged separate from the lighting module and mounted entirely within the housing interior, proximal the end cap.

2. The downlight of claim 1, wherein the mounting mechanism comprises a pair of spring clips mounted to opposing sides of the facing, the downlight further comprising:
- a reflector, comprising:
  - a first open end mounted to the heat sink, proximal the lighting module; and
  - a second open end distal the heat sink;
- a diffuser mounted to the second open end; and
- a swivel body encircling the reflector, statically mounted to the first housing end, and rotatably mounted to the facing, wherein the swivel body rotatably mounts the facing to the heat sink.

3. The downlight of claim 1, the downlight further comprising:
- a power supply unit; and
- a computing system;

wherein the power supply unit and the computing system are arranged separate from the lighting module and are mounted within the housing interior, wherein the housing defines a housing cavity, wherein the power supply unit, computing system, and the antenna are each arranged inside the housing cavity.

4. The downlight of claim 3, wherein the power supply unit, the computing system, and the wireless communication module are mounted on a common board, proximal the end cap.

5. The downlight of claim 4, wherein the power supply unit, the computing system, and the wireless communication module are arranged within a sleeve, the sleeve comprising a third thermal conductivity value less than the first thermal conductivity value.

6. The downlight of claim 5, wherein the sleeve is thermally connected to an ambient environment by the set of cooling channels.

7. The downlight of claim 1, wherein the housing further comprises an RF transparent sleeve comprising a third thermal conductivity value less than the first thermal conductivity value, wherein the sleeve is encapsulated by the heat sink and the end cap.

8. A luminaire, comprising:
- a housing comprising:
  - a first housing end having a first thermal conductivity value;
  - an RF-transparent second housing end opposing the first housing end, the second end having a second thermal conductivity value less than the first thermal conductivity value;
- a wireless communication module comprising an RF antenna, the RF antenna mounted entirely within the housing proximal the second housing end; and
- a lighting module mounted to and thermally connected to the first housing end, the lighting module comprising:
  - a substrate;
  - a plurality of light emitting elements mounted to the substrate, opposing the housing;
  - a facing mounted to the first housing end; and
  - a mounting mechanism mounted to the facing;

wherein the housing defines a longitudinal axis, wherein the lighting module, the first housing end, and the second housing end are coaxially aligned along the longitudinal axis.

9. The luminaire of claim 8, wherein the mounting mechanism comprises a pair of spring clips mounted to opposing sides of the facing, the luminaire further comprising:
- a reflector, comprising:
  - a first open end mounted to the first housing end, proximal the lighting module; and
  - a second open end distal the first housing end;
- a diffuser mounted to the second open end;
- a swivel body encircling the reflector, statically mounted to the first housing end, and rotatably mounted to the facing, wherein the swivel body rotatably mounts the facing to the first housing end.

10. The luminaire of claim 8, wherein the first housing end comprises a heat sink, the heat sink comprising a base with a perimeter, wherein the heat sink is mounted to and thermally connected to the lighting module.

11. The luminaire of claim 10, wherein the heat sink further comprises a plurality of teeth extending from the perimeter of the base, parallel to the longitudinal axis of the housing, towards the second housing end, wherein the facing has a facing height, wherein the heat sink has a heat sink height greater than the facing height.

12. The luminaire of claim 11, wherein the heat sink height is at least 30 mm tall.

13. The luminaire of claim 8, the luminaire further comprising:
- a power supply unit; and
- a computing system;

wherein the power converter and the processor are arranged separate from the lighting module and are mounted within the housing interior.

14. The luminaire of claim 13, wherein the power supply unit, the computing system, and the wireless communication module are mounted on a common board.

15. The luminaire of claim 14, wherein the power supply unit, the computing system, and the wireless communication module are arranged proximal the second housing end.

16. The luminaire of claim 15, wherein the power supply unit, the computing system, and the wireless communication module are arranged within a sleeve, the sleeve comprising a third thermal conductivity value less than the first thermal conductivity value.

17. The luminaire of claim 16, wherein the sleeve is fluidly connected to an ambient environment by a set of cooling channels defined by the housing.

18. The luminaire of claim 17, wherein the set of cooling channels is cooperatively defined by the first housing end and the second housing end.

* * * * *